(12) United States Patent
Hurtt

(10) Patent No.: US 10,197,127 B2
(45) Date of Patent: Feb. 5, 2019

(54) MONOTUBE DAMPER ASSEMBLY

(71) Applicant: BeijingWest Industries Co. Ltd., Beijing (CN)

(72) Inventor: Michael William Hurtt, Kettering, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 11 days.

(21) Appl. No.: 14/913,759

(22) PCT Filed: Mar. 6, 2014

(86) PCT No.: PCT/CN2014/072948
§ 371 (c)(1),
(2) Date: Feb. 23, 2016

(87) PCT Pub. No.: WO2015/027698
PCT Pub. Date: Mar. 5, 2015

(65) Prior Publication Data
US 2016/0208882 A1 Jul. 21, 2016

Related U.S. Application Data

(60) Provisional application No. 61/870,286, filed on Aug. 27, 2013.

(51) Int. Cl.
*F16F 9/53* (2006.01)
*F16F 9/06* (2006.01)

(52) U.S. Cl.
CPC .............. *F16F 9/061* (2013.01); *F16F 9/065* (2013.01); *F16F 9/067* (2013.01); *F16F 9/068* (2013.01)

(58) Field of Classification Search
CPC .. F16F 9/061; F16F 9/067; F16F 9/065; F16F 9/535; F16F 9/53; F16F 9/532; F16F 9/0218; F16F 9/068; F16F 9/096
See application file for complete search history.

(56) References Cited

U.S. PATENT DOCUMENTS 2,774,446 A * 12/1956 Bourcier de Carbon .................... F16F 9/061
188/269
3,419,113 A * 12/1968 Shelley ................... B66C 23/92
137/512.2

(Continued)

FOREIGN PATENT DOCUMENTS

CN 1519488 A 8/2004
CN 102155513 A 8/2011

(Continued)

OTHER PUBLICATIONS

The State Intellectual Property Office in China, First Notification of Office Action; dated Sep. 5, 2016; 6 Pages.

(Continued)

*Primary Examiner* — Bradley T King
*Assistant Examiner* — Stephen M Bowes
(74) *Attorney, Agent, or Firm* — William H. Honaker; Dickinson Wright PLLC

(57) ABSTRACT

A monotube damper assembly includes a housing presenting a wall extending between a rod end and a closed end to define a main chamber. A gas cup having a top portion and a body portion is disposed in the main chamber to divide the main chamber of the housing into a gas chamber and a fluid chamber. The gas cup includes a top portion and a body portion. A piston is disposed in the fluid chamber. A rod guide is disposed adjacent to the rod end and spaced part from the piston. A piston rod is connected to the piston. A gas damper having a cylindrical shape includes a restrictor disposed the body portion of gas cup and the top potion of the gas cup for providing additional damping force to the gas cup.

9 Claims, 3 Drawing Sheets

(56) References Cited

U.S. PATENT DOCUMENTS

| | | | |
|---|---|---|---|
| 3,647,239 A | 3/1972 | Katsumori | |
| 2004/0134728 A1* | 7/2004 | Lisenker | F16F 9/535 |
| | | | 188/267.2 |
| 2006/0180418 A1* | 8/2006 | Kojima | F15B 1/103 |
| | | | 188/314 |
| 2008/0314706 A1* | 12/2008 | Lun | F16F 9/067 |
| | | | 188/267.2 |

FOREIGN PATENT DOCUMENTS

| | | | | |
|---|---|---|---|---|
| GB | 1499396 A | * | 2/1978 | F16F 9/061 |
| JP | 2001295877 A | * | 10/2001 | |
| JP | 2007263324 A | | 10/2007 | |

OTHER PUBLICATIONS

State Intellectual Property Office of China Search Report; 4 Pages; dated Sep. 5, 2016.
International Search Report, dated May 30, 2014, 2 Pages.

* cited by examiner

MONOTUBE DAMPER ASSEMBLY

CROSS REFERENCE TO RELATED APPLICATION

This application claims the benefit of PCT International Application Serial No. PCT/CN2014/072948 filed on Mar. 6, 2014, which claims priority to U.S. Provisional Patent Application 61/870,286 filed on Aug. 27, 2013, and entitled "Monotube Damper Assembly."

BACKGROUND OF THE INVENTION

1. Field of the Invention

The present invention relates to a monotube damper assembly for use in a vehicle.

2. Description of the Prior Art

Monotube damper assemblies are well known in the prior art. The U.S. Pat. No. 8,240,642 to Hamberg et al. discloses a monotube damper assembly including a housing defining a main chamber extending along a center axis between a rod end and a closed end. A gas cup is disposed in the main chamber and is slidable along the center axis to divide the main chamber into a gas chamber extending between the closed end and the gas cup for containing a high pressured gas and a fluid chamber extending between the gas cup and the rod end. A piston is disposed in the fluid chamber and is axially slidable along the center axis. A piston rod is connected to the piston and extends through the rod end. The gas cup includes a top portion and a body portion extending from the top portion and about the center axis.

SUMMARY OF THE INVENTION

The present invention provides for such monotube damper assembly for use in a vehicle including a gas damper having a restrictor disposed in the gas chamber dividing the gas chamber into an upper chamber and a lower chamber for providing additional damping force to the gas cup by limiting flow of the high pressured gas between the upper chamber and the lower chamber in response to a sliding movement of the gas cup.

The present invention improves monotube damper assembly performance by providing an additional damping force to the gas cup of the monotube damper assembly. In addition, the present invention provides for an additional dynamic pressure to the gas cup at higher velocities which results in the onset of lag happening at the higher velocity. As a result, a maximum damping can be tuned at a desired velocity for the monotube damper assembly.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
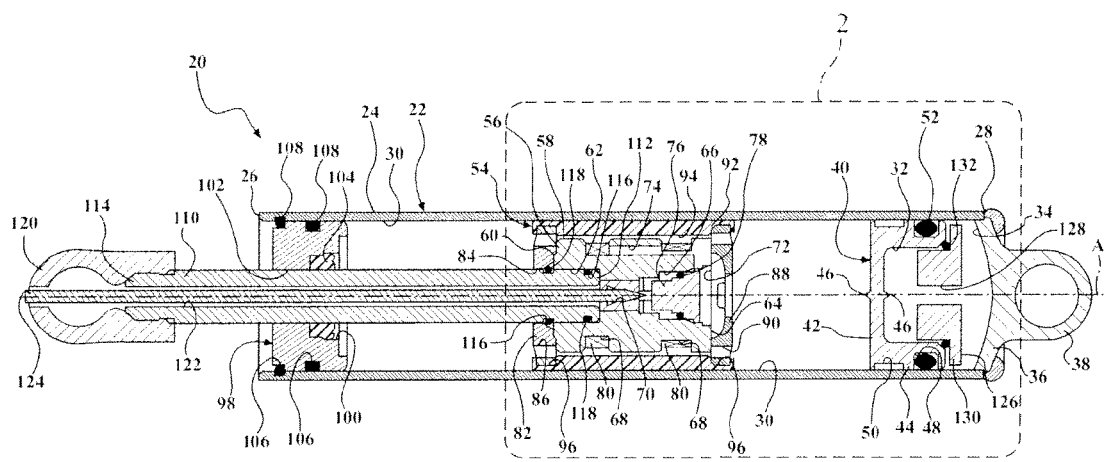
FIG. 1 is a cross-sectional view of the monotube damper assembly.

Referring to the Figures, wherein like numerals indicate corresponding parts throughout the several views, a monotube damper assembly for use in a vehicle constructed in accordance with the subject invention is shown in FIG. 1.

Figure 2:
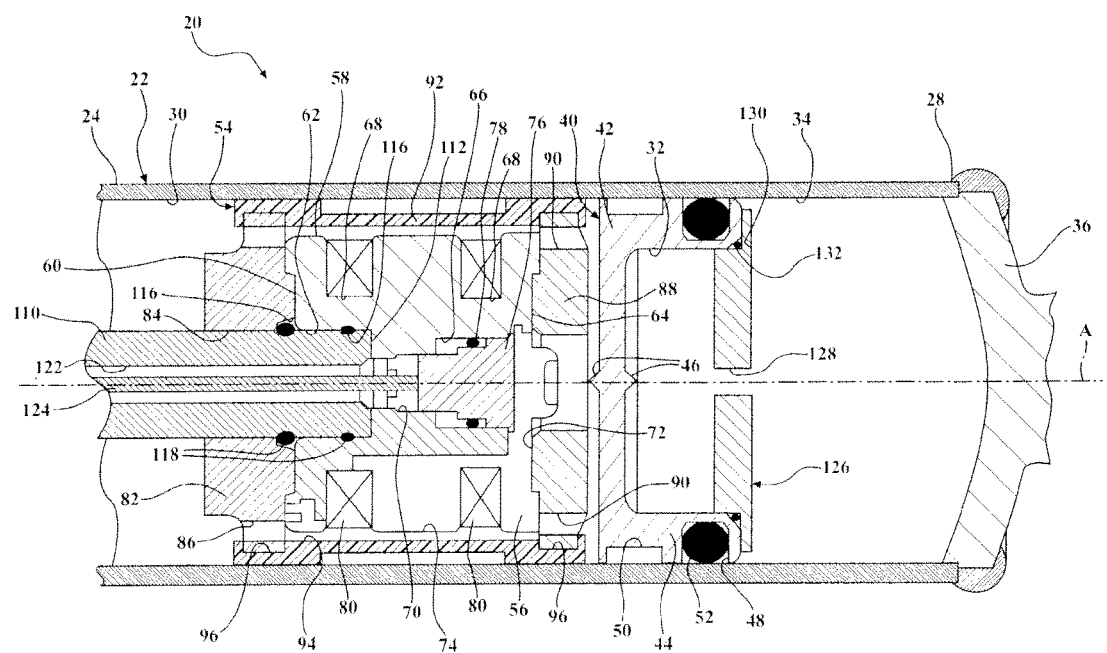
FIG. 2 is an enlarged fragmentary cross-sectional view of the piston and the gas cup of the monotube damper assembly taken with the rectangle labeled 2 in FIG. 1.

The assembly 20, as generally shown in FIG. 2, includes a housing 22, as generally indicated, presenting a wall 24 having a tubular shape disposed annularly about a center axis A and extending between a rod end 26 and a closed end 28 to define a main chamber 30, 32, 34. An end cap 36 is disposed over the closed end 28 and presents a first mounting ring 38 for attaching the housing 22 to the vehicle.

A gas cup 40, as generally indicated, is disposed in the main chamber 30, 32, 34 adjacent to the end cap 36 and is slidable along the center axis A to divide the main chamber 30, 32, 34 of the housing 22 into a gas chamber 32, 34 extending between the closed end 28 and the gas cup 40 for containing a high pressured gas and a fluid chamber 30 extending between the gas cup 40 and the rod end 26 for containing a magneto rheological fluid having a predetermined viscosity. In other words, the main chamber 30, 32, 34 is separated into the gas chamber 32, 34 and the fluid chamber 30 by the gas cup 40 wherein the gas chamber 32, 34 contains the high pressured gas and extends between the closed end 28 and the gas cup 40 and the fluid chamber 30 contains the magneto rheological fluid and extends between the gas cup 40 and the rod end 26. Alternatively, instead of containing a magneto rheological fluid, the fluid chamber 30 may contain a damping fluid such as a hydraulic fluid.

The gas cup 40 includes a top portion 42 having a circular shape and a body portion 44 having a cylindrical shape extending annularly about the center axis A from the top portion 42. The top portion 42 of the gas cup 40 presents a pair of protrusions 46 extending axially from the top portion 42 and disposed diametrically from one another across the center axis A. The body portion 44 of the gas cup 40 defines a seal groove 48 and a body groove 50 extending annularly about the center axis A and spaced from one another axially along the body portion 44. A gas seal 52 is disposed in the seal groove 48 extending annularly about the body portion 44 of the gas cup 40 and in sealing engagement with the wall 24 of the housing 22 for sealing the gas chamber 32, 34.

A piston 54, as generally indicated, having a cylindrical shape is disposed in the fluid chamber 30 of the housing 22 spaced from the gas cup 40 and is axially slidable along the center axis A. The piston 54 includes a core unit 56 having a cylindrical shape defining an outer surface 58 extending annularly about the center axis A and a core top 60 presenting a depression 62 having a cylindrical shape extending along the center axis A. The core unit 56 also includes a core bottom 64 presenting a cavity 66 having a cylindrical shape extending along the center axis A. The outer surface 58 of the core unit 56 presents a plurality of core grooves 68 extending annularly about the center axis A between the core top 60 and the core bottom 64 of the core unit 56. The core unit 56 defines a core unit channel 70 extending along the center axis A and in fluid communication with the depression 62 and the cavity 66.

The core bottom 64 of the core unit 56 defines a primary channel 72, 74 having a L-shape in fluid communication between the cavity 66 and the core grooves 68. The primary channel 72, 74 includes a first passage 72 extending radially outwardly from the cavity 66 and perpendicular to the center axis A to establish fluid communication with the outer surface 58 of the core unit 56. The primary channel 72, 74 includes a second passage 74 extending along the outer surface 58 of the core unit 56 parallel to the center axis A to establish fluid communication with the core grooves 68.

A stopper 76 is slidably disposed in the cavity 66 and extends along the center axis A for closing the core unit channel 70. A stopper seal 78 is disposed annularly about the stopper 76 and engages the stopper 76 and the core unit 56 for securing the stopper 76 in the cavity 66 of the core unit 56. A plurality of coils 80 are disposed in the core groove 68 of the core unit 56 and extends annularly about the core unit 56 and the center axis A for providing a magnetic field to change the predetermined viscosity of the magneto rheological fluid.

An upper plate 82 having a circular shape is disposed concentrically to the core unit 56 and abuts the core top 60 of the core unit 56. The upper plate 82 presents an upper plate mounting aperture 84 extending through the upper plate 82 and disposed on the center axis A. The upper plate 82 presents a plurality of upper plate apertures 86 extending through the upper plate 82 disposed about the upper plate mounting aperture 84. A lower plate 88 having a circular shape is disposed concentrically to the core unit 56 and abutting the core bottom 64 of the core unit 56. The lower plate 88 presents a plurality of lower plate apertures 90 extending through the lower plate 88 and disposed about the center axis A.

A flux ring 92 having a cylindrical shape is disposed about and spaced from the core unit 56 to define a fluid channel 94 extending between the flux ring 92 and the outer surface 58 of the core unit 56 in fluid communication with the upper plate apertures 86 and the lower plate apertures 90 for allowing the magneto rheological fluid to flow through the piston 54. The flux ring 92 presents a plurality of flux ring recesses 96 extending annularly about the center axis A and spaced axially from one another in the flux ring 92 for receiving the upper plate 82 of the piston 54 and the lower plate 88 of the piston 54. Alternatively, the piston 54 may include a core unit 56 having a core top 60 and a core bottom 64 defining at least one fluid channel 94 extending from the core top 60 to the core bottom 64 of the core unit 56.

A rod guide 98, as generally indicated, having a cylindrical shape is disposed concentrically on the center axis A in the fluid chamber 30 and engages the housing 22 adjacent to the rod end 26 and spaced part from the piston 54. The rod guide 98 defines a central bore 100, 102 having a cylindrical shape presenting a groove section 100 and a pit section 102 extending along the center axis A. A piston rod seal 104 is disposed in the groove section 100 of the central bore 100, 102 extending annularly about the center axis A. The rod guide 98 defines a plurality of rod guide grooves 106 extending annularly about the rod guide 98 and the center axis A. A rod guide seal 108 extends annularly about the rod guide 98 in each of the rod guide grooves 106 and engaging the wall 24 of the housing 22 for sealing the fluid chamber 30.

A piston rod 110 extends between a mating end 112 and a mounting end 114 along the center axis A and is connected to the depression 62 of the core unit 56 of the piston 54 at the mating end 112 of the piston 54. The piston rod 110 extends through the upper plate 82 the pit section 102 of the rod guide 98 and slidably engages the piston rod seal 104 to interconnect the core unit 56 with the upper plate 82 and the rod guide 98. In other words, the piston 54 extends through the pit section 102 of the rod guide 98 and connects with the core unit 56 of the piston 54 for allowing the piston 54 to slide along the center axis A between the gas cup 40 and the rod guide 98. The piston rod 110 defines a plurality of retainer grooves 116 extending annularly about the piston rod 110 adjacent to the mating end 112 and spaced axially apart from one another. A retainer ring 118 is disposed in each of the retainer grooves 116 and engages the core unit 56 and the upper plate 82 for securing the core unit 56 and the upper plate 82 to the piston rod 110. A second mounting ring 120 is disposed on the mounting end 114 of the piston rod 110 for attaching the piston rod 110 to the vehicle.

The piston rod 110 defines a piston rod channel 122 extending through the piston rod 110 on the center axis A. A plurality of wires 124 are disposed in the piston rod channel 122 and extend through the core unit channel 70 and the primary channel 72, 74 and electrically connected to the coils 80 for providing power to the coils 80.

A gas damper 126 having a cylindrical shape includes a restrictor disposed spaced axially between the body portion 44 of gas cup 40 and the top potion of the gas cup 40 and dividing the gas chamber 32, 34 into an upper chamber 32 extending between the top portion 42 of the gas cup 40 and the gas damper 126 and a lower chamber 34 extending between the gas damper 126 and the closed end 28 for providing additional damping force to the gas cup 40 by limiting flow of the high pressured gas between the upper chamber 32 and the lower chamber 34 in response to a sliding movement of the gas cup 40.

The restrictor of the gas damper 126 presents an orifice 128 disposed on the gas damper 126 extending along the center axis A and in fluid communication with the upper chamber 32 and the lower chamber 34 for limiting flow of the high pressured gas between the upper chamber 32 and the lower chamber 34 disposed in the gas chamber 32, 34 to provide the additional damping force to the gas cup 40. In other words, during the sliding movement of the gas cup 40 the orifice 128 limits amount of the high pressured gas that can flow from the upper chamber 32 to the lower chamber 34. By limiting the amount of the high pressured gas that can flow from the upper chamber 32 to the lower chamber 34 the additional damping force is provided to the gas cup 40. The gas damper 126 includes a projection 130 extending radially outwardly from the center axis A disposed adjacent to the body portion 44 of the gas cup 40 for preventing the gas damper 126 disposed in the body portion 44 from engaging the top portion 42 of the gas cup 40. A damper seal 132 is disposed between the body portion 44 and the gas damper 126 for securing the gas damper 126 in the body portion 44 of the gas cup 40.

Figure 3:
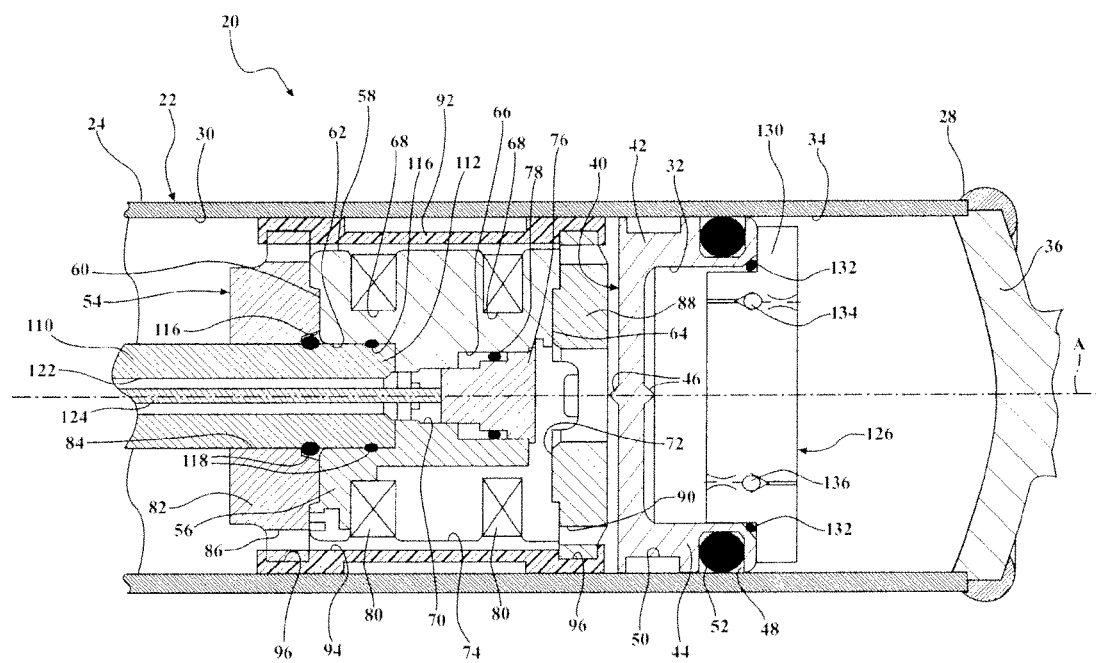
FIG. 3 is an enlarged fragmentary cross-sectional view of an alternative embodiment of the piston and the gas cup of the monotube damper assembly.

In an alternative embodiment of the present invention shown in FIG. 3, instead of having an orifice 128, the restrictor of the gas damper 126 includes a first check valve 134 extending through the gas damper 126 parallel to the center axis A for allowing the high pressured gas in the gas chamber 32, 34 to flow unidirectionally through the gas damper 126 from the lower chamber 34 to the upper chamber 32. The gas damper 126 includes a second check valve 136 extending through the gas damper 126 parallel to the center axis A for allowing the high pressured gas in the gas chamber 32, 34 to flow unidirectionally through the gas damper 126 from the upper chamber 32 to the lower chamber 34.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the

What is claimed is:

1. A monotube damper assembly for use in a vehicle comprising:
   a housing defining a main chamber extending along a center axis between a rod end and a closed end,
   a gas cup disposed in said main chamber in sealing engagement with said housing and slidable along said center axis to divide said main chamber into a gas chamber extending between said closed end and said gas cup for containing a gas and a fluid chamber extending between said gas cup and said rod end,
   a piston disposed in said fluid chamber and axially slidable along said center axis,
   a piston rod connected to said piston and extending through said rod end,
   said gas cup being rigid and including a top portion and a body portion extending from said top portion and about said center axis, and
   a gas damper having a restrictor, said gas damper being disposed in said gas chamber spaced from said housing and axially spaced from said top portion of said gas cup and attached to said body portion of said gas cup and dividing said gas chamber into an upper chamber and a lower chamber, with said upper chamber having a fixed volume and extending between said top portion and said body portion and said gas damper and said lower chamber being between said gas damper and said closed end, whereby in response to a sliding movement of said gas cup said restrictor limits flow of the gas between said upper chamber and said lower chamber to provide additional damping force.

2. The assembly as set forth in claim 1 wherein said restrictor of said gas damper has an orifice disposed in fluid communication with said upper chamber and said lower chamber for limiting flow of the gas between the upper chamber and the lower chamber to provide additional damping force to said gas cup during the sliding movement of the gas cup.

3. The assembly as set forth in claim 2 wherein said orifice is disposed on said center axis and extends along said center axis.

4. The assembly as set forth in claim 3 wherein said gas damper is spaced axially between said closed end and said top portion of said gas cup.

5. The assembly as set forth in claim 4 wherein said gas damper includes a projection extending radially outwardly from said center axis disposed adjacent to said body portion of said gas cup for preventing said gas damper from engaging said top portion of said gas cup.

6. The assembly as set forth in claim 5 further including a damper seal disposed in sealing engagement with said body portion and said gas damper.

7. The assembly as set forth in claim 1 wherein said restrictor includes a first check valve extending through said gas damper parallel to said center axis for allowing the gas in said gas chamber to flow unidirectionally through said gas damper from said lower chamber to said upper chamber.

8. The assembly as set forth in claim 7 wherein said gas damper includes a second check valve extending through said gas damper parallel to said center axis for allowing the gas in said gas chamber to flow unidirectionally through said gas damper from said upper chamber to said lower chamber.

9. The assembly as set forth in claim 1 further including a gas seal disposed annularly about said gas cup and in sealing engagement with said housing.

* * * * *